(12) United States Patent
Kalergis et al.

(10) Patent No.: US 8,770,661 B2
(45) Date of Patent: Jul. 8, 2014

(54) CONFIGURABLE UNDERSEAT STORAGE FEATURE

(75) Inventors: Peter Nicholas Kalergis, Canton, MI (US); Alexander Gidley, Ann Arbor, MI (US); Alexander Sigal, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 13/537,262

(22) Filed: Jun. 29, 2012

(65) Prior Publication Data

US 2014/0001798 A1   Jan. 2, 2014

(51) Int. Cl.
*A47C 7/62* (2006.01)
*B60R 7/04* (2006.01)

(52) U.S. Cl.
USPC .................... 297/188.1; 296/37.15

(58) Field of Classification Search
USPC ............. 297/188.01, 188.08, 188.12, 188.09, 297/188.11, 188.1, 188.2, 331; 296/37.15; 224/275, 539
See application file for complete search history.

(56) References Cited

U.S. PATENT DOCUMENTS

| | | | | |
|---|---|---|---|---|
| 618,264 | A | * | 1/1899 | Burtless .............................. 5/58 |
| 3,131,813 | A | * | 5/1964 | Jensen .......................... 224/275 |
| 5,474,377 | A | * | 12/1995 | Cone et al. .................... 312/326 |
| 5,957,521 | A | | 9/1999 | Schlachter |
| 6,053,553 | A | * | 4/2000 | Hespelt ........................ 296/37.1 |
| 6,074,000 | A | * | 6/2000 | Wagner .................... 297/188.11 |
| 6,106,044 | A | | 8/2000 | Schlachter |
| 6,520,364 | B2 | * | 2/2003 | Spykerman et al. ............. 220/6 |
| 6,626,478 | B1 | | 9/2003 | Minton |
| 7,300,088 | B1 | | 11/2007 | Catenacci et al. |
| 7,780,229 | B2 | * | 8/2010 | Verhee ..................... 297/188.21 |
| 2006/0099057 | A1 | | 5/2006 | Fair |

* cited by examiner

*Primary Examiner* — Milton Nelson, Jr.
(74) *Attorney, Agent, or Firm* — Vichit Chea; Price Heneveld LLP

(57) ABSTRACT

A vehicular underseat storage assembly includes a rigid first side wall pivotally connected to a first stanchion. A rigid second side wall is pivotally connected to a second stanchion. A rigid front wall couples a forward end of the first side wall to a forward end of the second side wall. The first side wall, second side wall, and front wall define a storage cavity operable between a collapsed condition and a deployed condition. Substantially all of an inside surface of the first side wall is in abutting contact with an inside surface of the front wall when the storage cavity is in the collapsed condition.

19 Claims, 8 Drawing Sheets

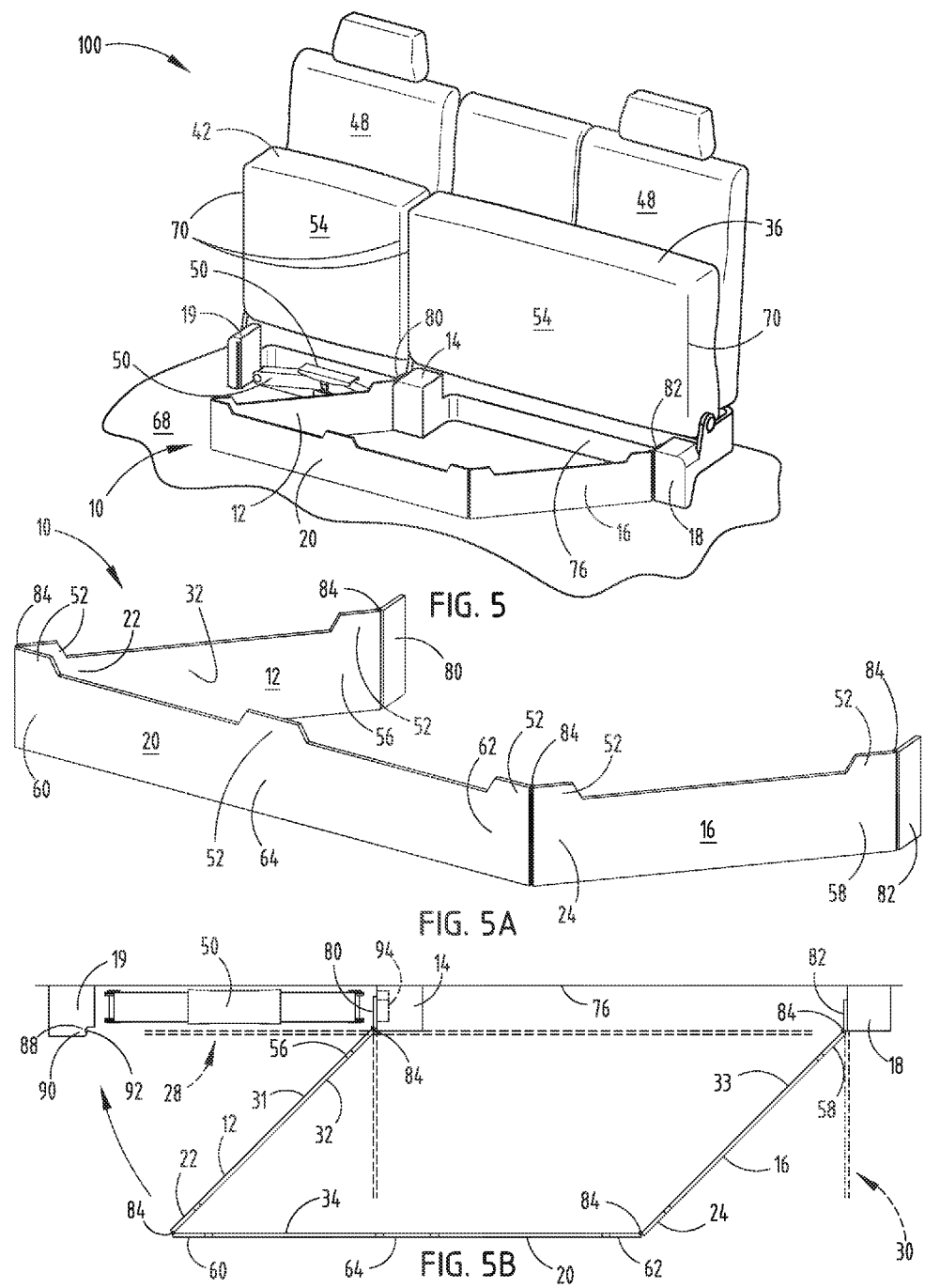

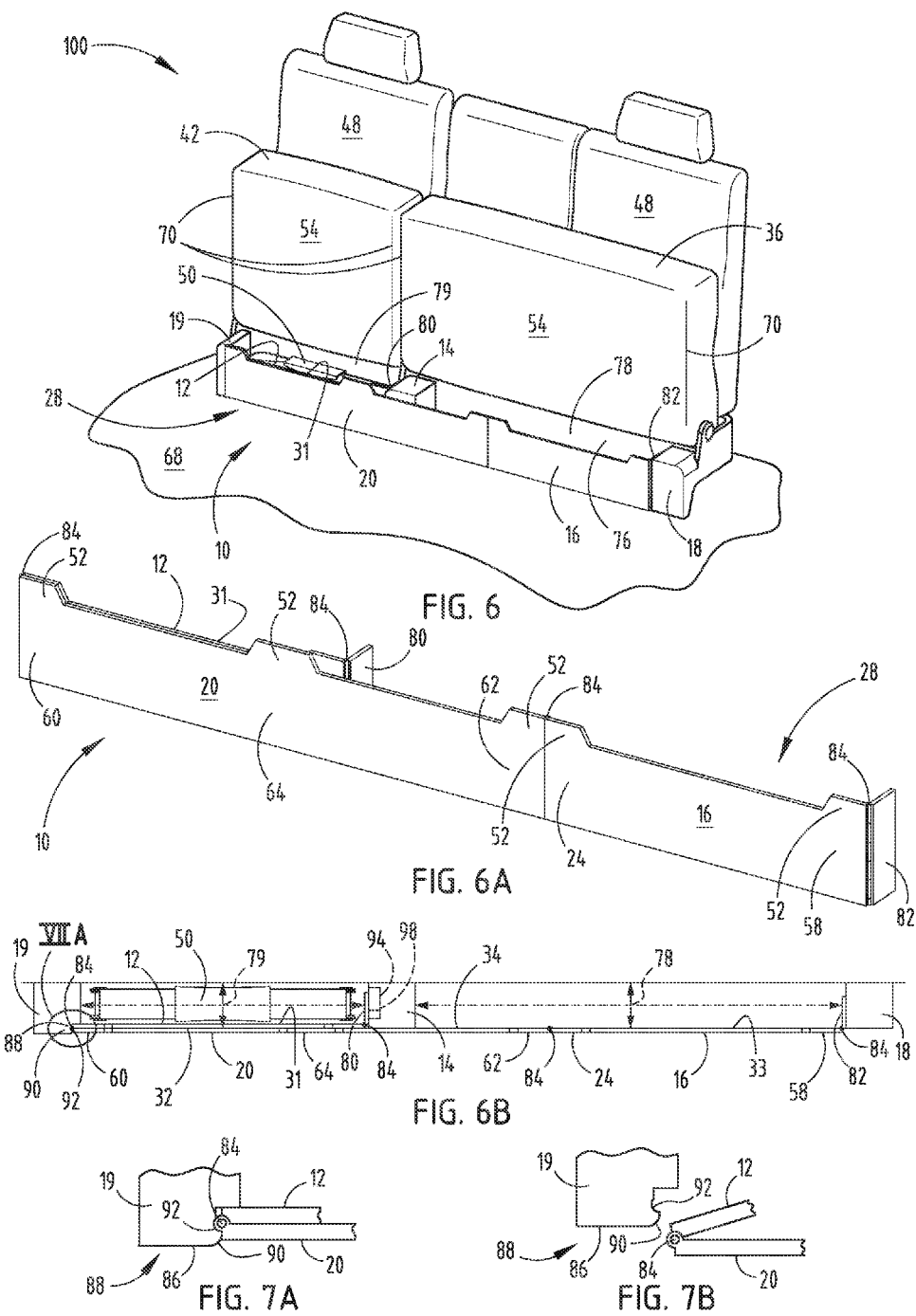

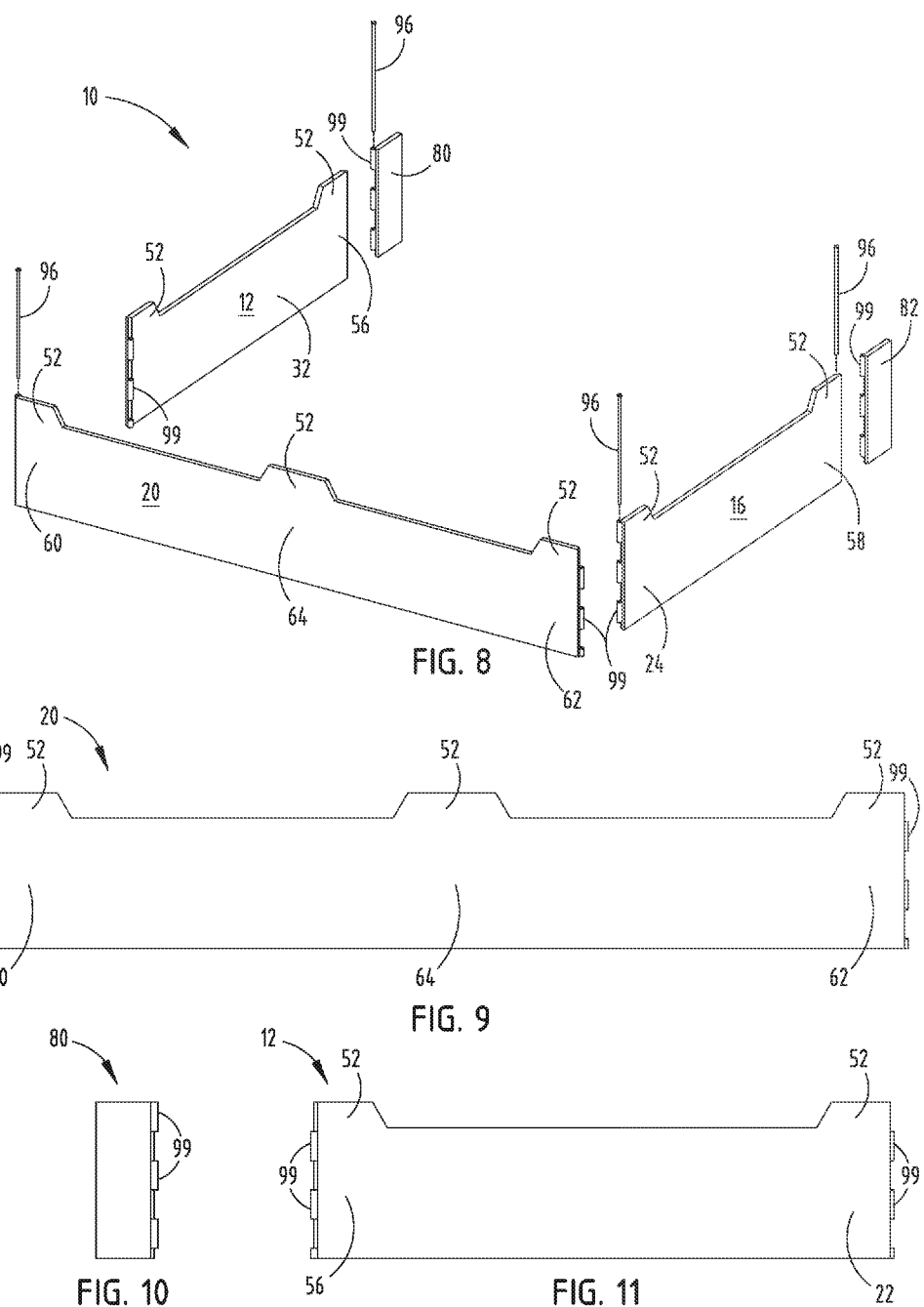

CONFIGURABLE UNDERSEAT STORAGE FEATURE

FIELD OF THE INVENTION

The present invention generally relates to an underseat storage feature for a vehicle, and more particularly, to a configurable underseat storage feature for a vehicle.

BACKGROUND OF THE INVENTION

Interior compartments of vehicles include various storage compartments and areas. For example, drawers have been configured for the underseat area of vehicle seats and netting has been configured for storage across the rearward facing surface of seat backs.

SUMMARY OF THE INVENTION

According to one aspect of the present invention, a vehicular underseat storage assembly includes a rigid first side wall pivotally connected to a first stanchion. A rigid second side wall is pivotally connected to a second stanchion. A rigid front wall couples a forward end of the first side wall to a forward end of the second side wall. The first side wall, second side wall, and front wall define a storage cavity operable between a collapsed condition and a deployed condition. Substantially all of an inside surface of the first side wall is in abutting contact with an inside surface of the front wall when the storage cavity is in the collapsed condition.

According to another aspect of the present invention, a vehicular underseat storage assembly includes a seat. A rigid first side wall and a rigid second side wall are disposed below the seat. A rigid front wall couples a forward end of the first side wall to a forward end of the second side wall. The first side wall, second side wall, and front wall, together with a floor and an underside of the seat, define a storage cavity operable between a deployed condition in which the storage cavity includes a rectangular-shaped cross-section, and a collapsed condition in which the storage cavity includes a generally linear-shaped cross-section.

According to yet another aspect of the present invention, a vehicular underseat storage assembly includes a rigid first side wall pivotally connected to a first stanchion. A rigid second side wall is pivotally connected to a second stanchion. A rigid front wall couples a forward end of the first side wall to a forward end of the second side wall. The first and second side walls and front wall, together with a floor and a vehicle seat, define a laterally collapsible storage cavity.

A vehicular underseat storage assembly having a storage cavity operable between a collapsed condition and a deployed condition provides a collapsible concealed area for storing various items. In the deployed condition, such a vehicular underseat storage assembly prevents objects contained in the storage cavity from rolling or sliding along a floor of a vehicle, which may could not only damage the object, but also present a safety hazard for vehicle passengers. In addition, the vehicular underseat storage assembly in the collapsed condition may be configured to create a smaller storage area under a first vehicle seat and to conceal a jack assembly mounted under a second vehicle seat.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a front perspective view of a vehicular underseat storage assembly of the present invention with a storage cavity transitioning between deployed and collapsed conditions;

FIG. 5A is an enlarged front perspective view of the storage cavity of FIG. 5;

FIG. 5B is an enlarged top plan view of the storage cavity of FIG. 5;

FIG. 6 is a front perspective view of a vehicular underseat storage assembly of the present invention with a storage cavity in a collapsed condition;

FIG. 6A is an enlarged front perspective view of the storage cavity of FIG. 6;

FIG. 6B is an enlarged top elevational view of the storage cavity of FIG. 6;

FIG. 7A is an enlarged top partial elevational view of a connector of FIG. 6B marked as VIIA;

FIG. 7B is an enlarged top partial elevational view of the connector of FIG. 7A with the storage cavity transitioning between the deployed and collapsed conditions;

FIG. 8 is an enlarged exploded perspective view of a front wall, a first side wall, and a second side wall of the vehicular underseat storage assembly of the present invention;

FIG. 9 is a front enlarged elevational view of the front wall of FIG. 8;

FIG. 10 is a side enlarged elevational view of the first stanchion of FIG. 8;

FIG. 11 is a side enlarged elevational view of the first side wall of FIG. 8;

DETAILED DESCRIPTION OF THE EMBODIMENTS

Figure 1:
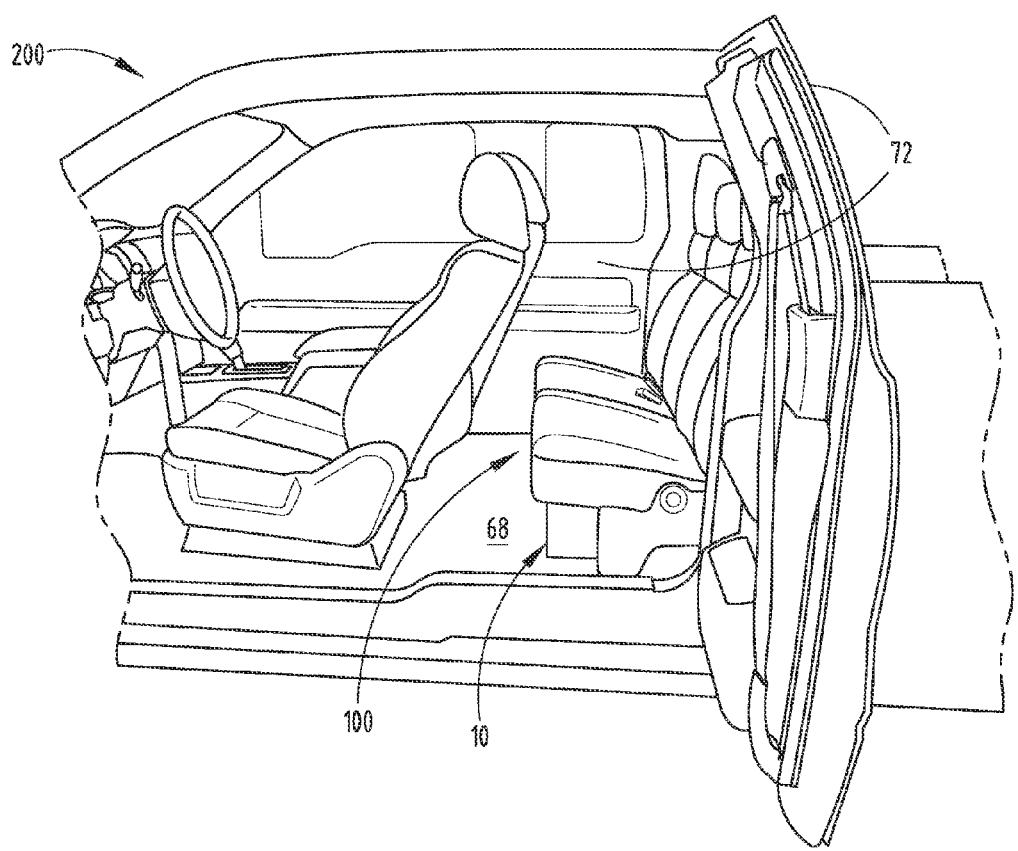
FIG. 1 is a side perspective view of a vehicle of the present invention with a door in an open position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-15B, reference numeral 10 generally designates a vehicular underseat storage assembly that has a rigid first side wall 12 pivotally connected to a first stanchion 14. A rigid second side wall 16 is pivotally connected to a second stanchion 18. A rigid front wall 20 couples a forward end 22 of the first side wall 12 to a forward end 24 of the second side wall 16. The first side wall 12, second side wall 16, and front wall 20 define a storage cavity 26 operable between a collapsed condition 28 (FIG. 2) and a deployed condition 30 (FIG. 2A). Substantially all of an inside surface 32 of the first side wall 12 is in abutting contact with an inside surface 34 of the front wall 20 when the storage cavity 26 is in the collapsed condition 28.

As illustrated in FIG. 1, the vehicular underseat storage assembly 10 is typically disposed under a vehicle seating assembly 100 connected to an automotive vehicle 200. The vehicle seating assembly 100, as illustrated, is installed under a rear bench seat of a truck. However, it is contemplated that the vehicular underseat storage assembly 10 can be disposed at various locations in the passenger compartment of a variety of automotive vehicles.

Figure 2:
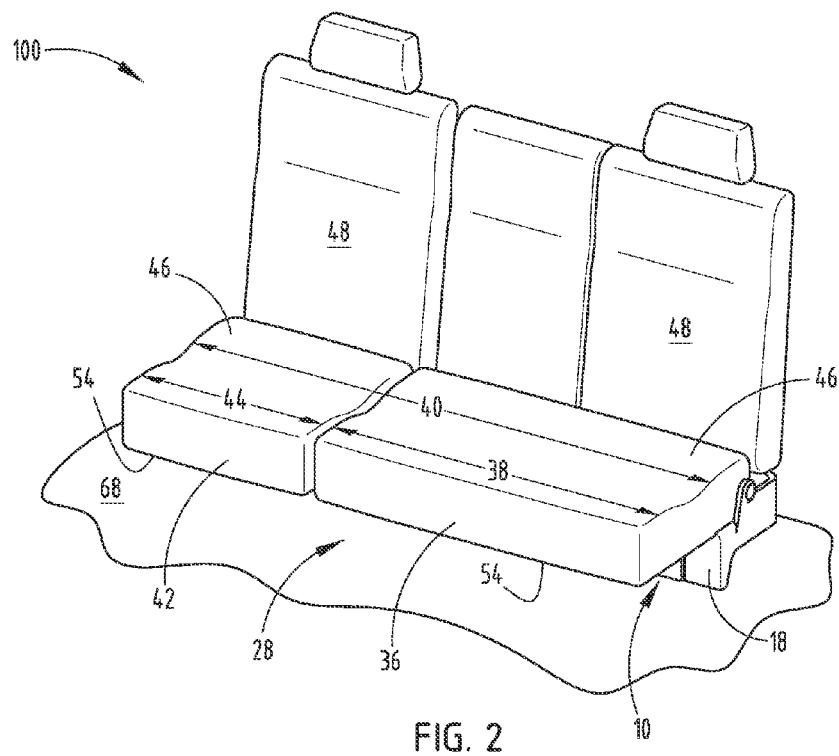
FIG. 2 is a front perspective view of a vehicle seating assembly of the present invention with a storage cavity in a collapsed condition.
Figure 2A:
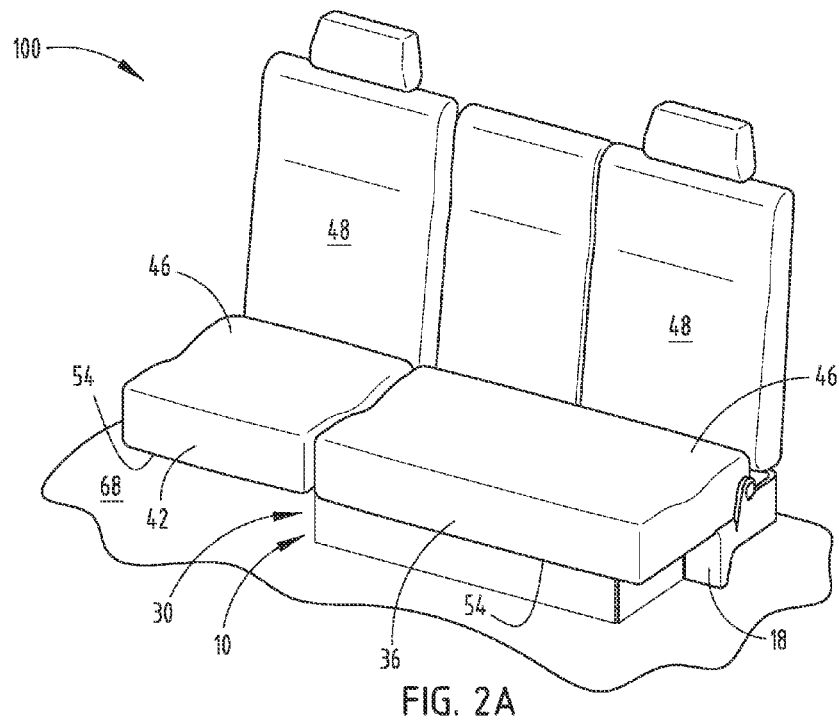
FIG. 2A is a front perspective view of a vehicle seating assembly of the present invention with a storage cavity in a deployed condition.
Figure 3:
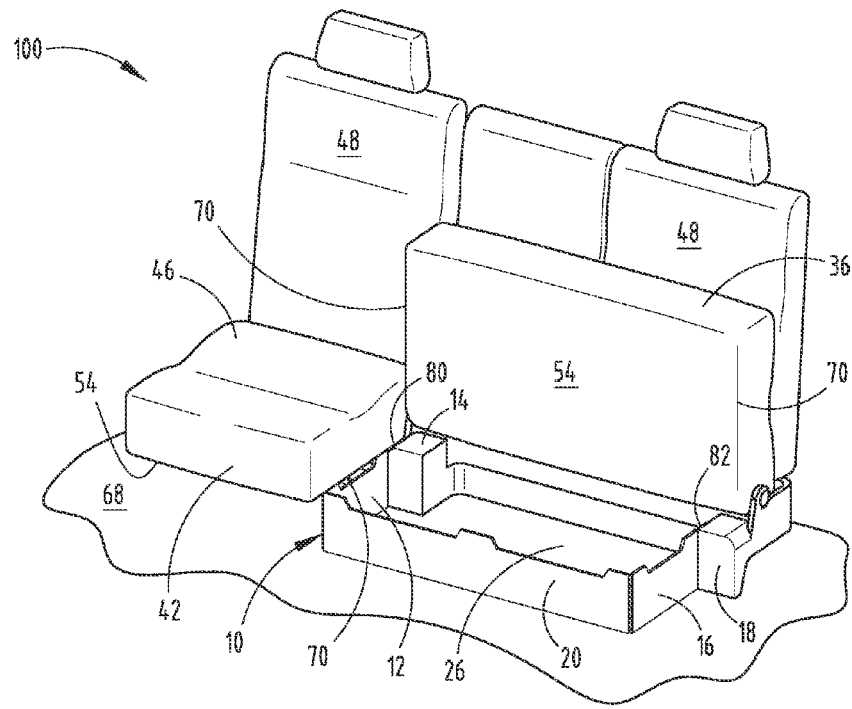
FIG. 3 is a front perspective view of a vehicular underseat storage assembly of the present invention with a first seat in a raised position and a storage cavity in a deployed condition.
Figure 4:
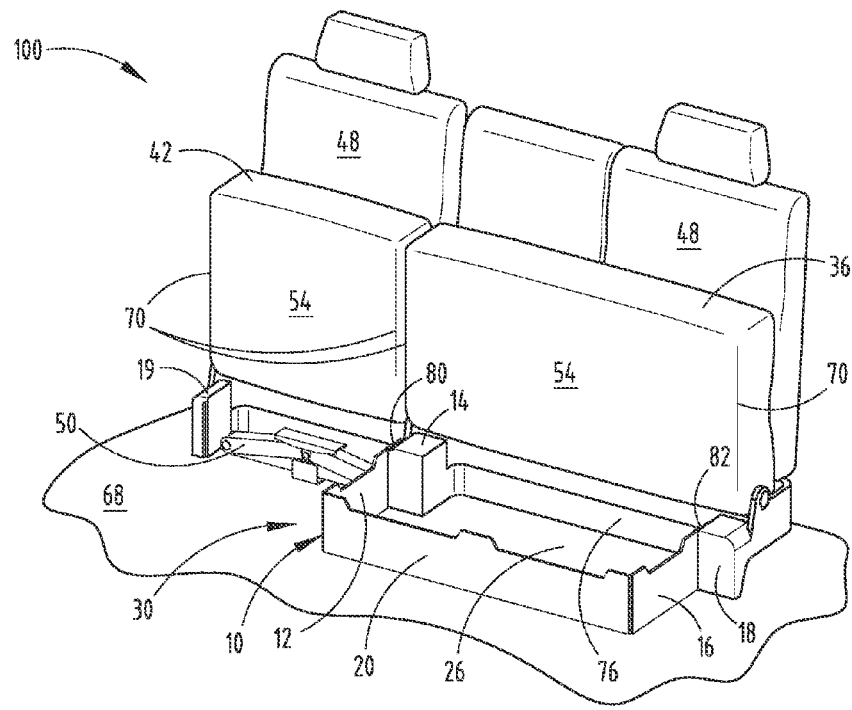
FIG. 4 is a front perspective view of the vehicular underseat storage assembly of FIG. 3 with a second seat in the raised position.

Referring now to FIGS. 2-4, the vehicle seating assembly 100 has a first seat 36 with a length 38 that is approximately sixty percent of a length 40 of the vehicle seating assembly 100, and a second seat 42 with a length 44 that is approximately forty percent of the length 40 of the vehicle seating assembly 100 (FIG. 2). The first and second seats 36, 42 are foldable from a sitting position where an upper surface 46 of the first and second seats 36, 42 are substantially horizontal to a raised position where the upper surface 46 of the first and second seats 36, 42 generally abuts seat backs 48 (FIG. 4). The first seat 36 may be lifted to the raised position, as illustrated in FIG. 3, exposing the storage cavity 26 of the vehicular underseat storage assembly 10 in the deployed condition 30. Further, the second seat 42 may be lifted to the raised position, as illustrated in FIG. 4, exposing tools, such as a jack assembly 50, that can be mounted or stored under the second seat 42.

Figure 4A:
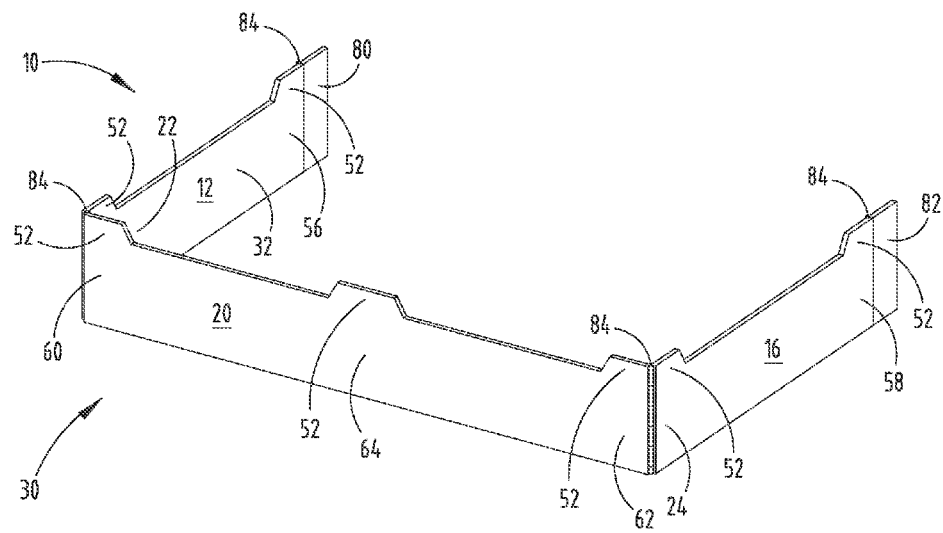
FIG. 4A is an enlarged front perspective view of the storage cavity of FIG. 4.

As illustrated in FIG. 4A, the first side wall 12, the second side wall 16, and the front wall 20 include a series of projections 52 adapted to abut an underside 54 of the first seat 36 (FIG. 4). The projections 52 are positioned at corners of the storage cavity 26. More specifically, the projections 52 are positioned at forward ends 22, 24 and rearward ends 56, 58 of the first and second side walls 12, 16, respectively. The projections 52 are also disposed at first and second ends 60, 62 of the rigid front wall 20. One of the projections 52 is also included at an intermediate portion 64 of the front wall 20. The underside 54 of the second seat 42 may abut the projections 52 on the first side wall 12 and the rigid front wall 20 when the vehicular underseat storage assembly 10 is transitioning to or is in the deployed condition 30 (FIGS. 5 and 6). The width of the first side wall 12, the second side wall 16, and the front wall 20 is generally equal and typically between 2 mm and 15 mm, although the width of these components could be outside this range.

Figure 4B:
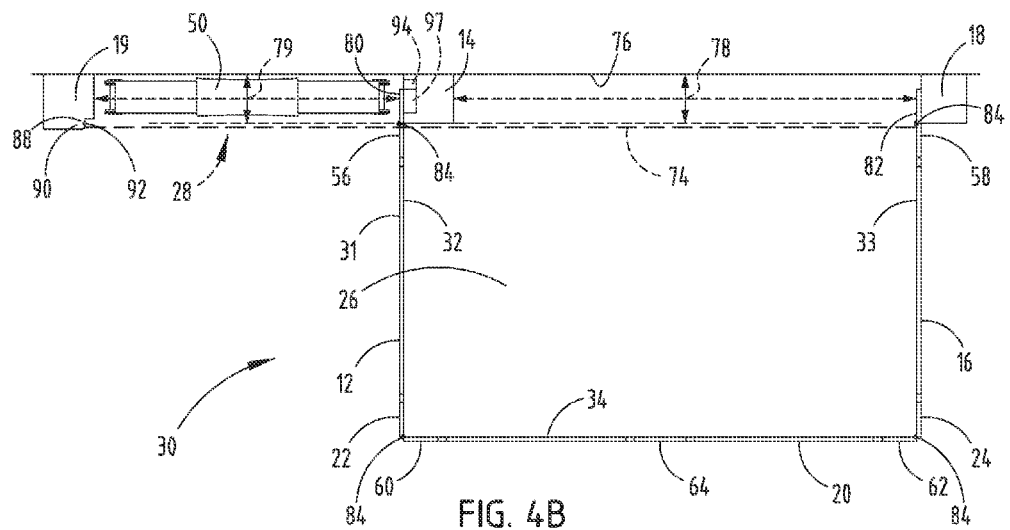
FIG. 4B is an enlarged top plan view of the storage cavity of FIG. 4.

The vehicle seating assembly 100, as shown in FIGS. 4-4B, includes the first and second stanchions 14, 18, as well as a third stanchion 19, that attach the vehicle seating assembly 100 to a floor 68 of the vehicle 200. The first, second, and third stanchions 14, 18, 19 are positioned at outer edges 70 of the first and second seats 36, 42. The first and second seats 36, 42, as illustrated, share the first stanchion 14. The second and third stanchions 18, 19 are positioned at the outer edges 70 of the first and second seats 36, 42, closest to a door 72 of the vehicle 200 (FIG. 1). The first, second, and third stanchions 14, 18, 19 are generally linearly aligned, defining an invisible line 74 extending along a forward surface of the first, second, and third stanchions 14, 18, 19. The area rearward of the invisible line 74 defines a secondary cavity that may be parceled into multiple storage areas, including a first storage area 78 and a second storage area 79. The first storage area 78 is formed between the first and second stanchions 14, 18 and between a rear wall 76 of the vehicle 200 and an inside surface 33 of the second side wall 16 and a portion of the inside surface 34 of the front wall 20 when the storage cavity 26 is in the collapsed condition 28. The second storage area 79 is formed between the first and third stanchions 14, 19 and between the rear wall 76 and an outside surface 31 of the first side wall 12 when the storage cavity 26 is in the collapsed condition 28. Accordingly, the first and second storage areas 78, 79 are formed when the storage cavity 26 is in the collapsed condition 28. Further, the first storage area 78 becomes an integral area with the storage cavity 26 when the storage cavity 26 is in the deployed condition 30. The first and second storage areas 78, 79 can be accessed by lifting the first or second seats 36, 42, respectively, to the raised position. As best illustrated in FIGS. 4 and 4B, the jack assembly 50 may be stored in the second storage area 79 under the second seat 42. However, alternatively, the jack assembly 50 may also be located in the first storage area 78 under the first seat 36.

As illustrated in FIG. 4A, the front wall 20 is pivotally coupled with the forward end 22 of the first side wall 12 and the forward end 24 of the second side wall 16. The first side wall 12 is generally rigid and pivotally coupled with the first stanchion 14. Similarly, the second side wall 16 is generally rigid and pivotally coupled with the second stanchion 18. A first hinge member 80 and a second hinge member 82 are pivotally coupled with the rearward ends 56, 58 of the first and second side walls 12, 16, respectively. As shown in FIG. 4B, the first hinge member 80 is slidably coupled with the first stanchion 14, allowing for lateral movement of the first hinge member 80 and the first side wall 12 to position the storage cavity 26 between the collapsed and deployed conditions 28, 30. The second hinge member 82 is fixedly attached to the second stanchion 18 by a fastening mechanism, such as screws or bolts. In another embodiment, the second hinge member 82 is slidably coupled with the second stanchion 18 and the first hinge member 80 is fixedly coupled with the first stanchion 14.

Referring now to FIG. 4B, the first and second side walls 12, 16 are generally equal in length and positioned parallel to each other. The first and second side walls 12, 16 may be formed from a rigid material, such as a hardened injection or blown molded plastic, a rigid composite material, a metal material, or other similar materials or combinations of materials having the rigid characteristics of the first and second side walls 12, 16. Further, the front wall 20 and the hinge members 80, 82 are constructed of a rigid material the same or similar to that of the first and second side walls 12, 16. Accordingly, the first and second side walls 12, 16 may be integrally formed with the respective hinge member 80, 82 and the front wall 20 as multiple integral pieces or one integral piece. The pivot connections formed between the first and second side walls 12, 16, the front wall 20, and the respective hinge members 80, 82 are adapted with a hinge assembly 84, such as a piano hinge, a living hinge, or other possible hinging configuration, as shown in FIGS. 14A-15B. The hinge assemblies 84 may also be integrally formed with the first and second side walls 12, 16, the front wall 20, or the hinge members 80, 82, such as an integrally formed hinge assembly.

The embodiment of FIGS. 4A and 4B illustrates the storage cavity 26 in the deployed condition 30. The storage cavity 26 is generally defined by the first and second side walls 12, 16, the front wall 20, the invisible line 74 of the first, second, and third stanchions 14, 18, 19, and the vehicle floor 68. The storage cavity 26 may also be accessed and removably enclosed at an upper opening of the storage cavity 26 by the first seat 36 (FIG. 2). The storage cavity 26 is operable between the deployed condition 30 and the collapsed condition 28. In the deployed condition 30, a cross-section of the storage cavity 26 has a rectangular shape. When the storage cavity 26 is transitioning to the collapsed condition 28 from the deployed condition 30, the cross-section of the storage cavity 26 is substantially rhomboid shaped (FIG. 5B).

As shown in FIGS. 5-5B, when the storage cavity 26 transitions between the deployed and collapsed conditions 28, 30, the first side wall 12, the second side wall 16, and the front wall 20 pivot about their respective hinge assemblies 84, but otherwise remain rigid as they move in close proximity or in frictional contact across the floor 68 of the vehicle 200. Due to the rigid formation of the first and second side walls 12, 16 and front wall 20, a user may transition the vehicular underseat storage assembly 10 between the deployed and collapsed conditions 28, 30 by manipulating any one of the first side wall 12, the second side wall 16, or the front wall 20. In such transition, the first and second side walls 12, 16 remain parallel with each other and the front wall 20 maintains an orientation substantially parallel to the rear wall 76 of the vehicle 200. Further, the rigid front wall 20 moves laterally from between the first and second stanchions 14, 18 to a distal location 86 that is a distance from the first stanchion 14 that is substantially equal to the length of the first side wall 12. The distal location 86 is substantially coplanar to the first and second stanchions 14, 18, and proximate at the third stanchion 19. To substantially align the distal location 86 with the third stanchion 19, the proportions of the front wall 20 in relation to the first and second side walls 12, 16 are defined by the length of the first and second side walls 12, 16 being proportionally approximately two-thirds that of the length of the front wall 20. The distal location 86 may also be an alternative coplanar position or a position on a side of or integrated into the jack assembly 50, which could include a bracket that also secures the jack assembly 50 to the vehicle floor 68.

Referring now to FIGS. 6-6B, in the collapsed condition 28, the vehicular underseat storage assembly 10 has a generally linear cross-section. Also, the front wall 20 is generally co-linear with the second side wall 16 and parallel with and abutting the first side wall 12. More specifically, the inside surface 34 of the front wall 20 abuts substantially the entire inside surface 32 of the first side wall 12. In such a condition, the front wall 20 has transitioned laterally a distance equal to a length of the second side wall 16. When the storage cavity 26 is in the collapsed condition 28, the first and second storage areas 78, 79 are defined between the rear wall 76 of the vehicle 200 and the storage cavity 26 in the collapsed condition 28 and the floor 68 of the vehicle 200. As illustrated in FIG. 6, the first and second storage areas 78, 79 are accessible when the first and second seats 36, 42 are in the raised position. The first and second storage areas 78, 79 are concealed when the first and second seats 36, 42, respectively, are lowered to the sitting position (FIG. 2). As mentioned above, the second storage area 79 under the second seat 42 may contain and conceal the jack assembly 50 (FIG. 6B). The second storage area 79 below the first seat 36 may be used to store other miscellaneous objects.

As best illustrated in FIGS. 7A and 7B, the distal location 86 has a connector 88, or other mechanical fastener, for securing the vehicular underseat storage assembly 10 in the collapsed condition 28. The connector 88 has a lip 90 that protrudes from the third stanchion 19, with an arcuate concave portion 92 of the lip 90 facing toward the first stanchion 14. The concave portion 92 is adapted to receive and frictionally engage the hinge assembly 84 between the first side wall 12 and the front wall 20. A user may engage or disengage the first side wall 12 and the front wall 20 from the connector 88 without the use of tools by simply pulling the front wall 20 or the first and second side walls 12, 16 toward the deployed condition 30. In doing so, the lip 90 flexes away from the first stanchion 14, allowing the front wall 20 and the first and second side walls 12, 16 to pivot and move. The connector 88 may also be a magnet, a snap, a strap, a clasp, or another device adapted to retain and secure the front wall 20 and the first side wall 12 when the storage cavity 26 is in the collapsed condition 28. The first side wall 12 also generally includes a complementary connecting member that is adapted to engage the connector 88. The complementary connecting member may include a protruding hinge assembly 84, as illustrated in FIGS. 7A and 7B, such as a receptor for a magnet, a snap, a strap, a clasp, or other mechanical fastener, for engaging the connector 88. The connector 88 may also be integrally formed with the third stanchion 19.

Referring again to FIGS. 4B, 5B, and 6B, a slider bracket 94 is disposed between the first hinge member 80 and the first stanchion 14, allowing the first hinge member 80 to be slidably coupled with the first stanchion 14. The slider bracket 94 allows for lateral movement of the first hinge member 80 to compensate for the hinge assembly arrangement and the widths of the first and second side walls 12, 16 and the front wall 20 when transitioning the storage cavity 26 between the substantially linear collapsed condition 28 and the substantially rectangular deployed condition 30, as described above. The slider bracket 94 may be manipulated between a forward position 97 and a rearward position 98, wherein the slider bracket 94 transitions to the rearward position 98 when the storage cavity 26 is in the collapsed condition 28 and to the forward position 97 when the storage cavity 26 is in the deployed condition 30. The slider bracket 94 transitions between the forward and rearward positions 97, 98 a distance generally equal to the general width of the first side wall 12. The slider bracket 94 has a generally horizontal groove and a post engaged with the groove to accomplish the lateral movement. However, it is contemplated that other devices may be used to slidably couple the first hinge member 80 with the first stanchion 14, allowing the storage cavity 26 to have a substantially linear cross-section in the collapsed condition 28.

Referring now to FIG. 8, the vehicular underseat storage assembly 10 includes hinging assemblies 84 disposed at the pivot connections formed between the first and second side walls 12, 16, the front wall 20, and the respective hinge members 80, 82. The hinge assemblies 84 may be oriented to substantially limit the pivotable distance of the front wall 20 and the first and second side walls 12, 16. Specifically, the hinging assembly 84 disposed between the second hinge member 82 and the second side wall 16 may be a pivot rod 96 at an axis generally aligned with the inside surface 33 of the second side wall 16, restricting the second side wall 16 from pivoting beyond ninety degrees in the deployed condition 30. The pivotable movement may also be restricted by a stop (not shown) formed in the vehicle floor 68, wherein the second side wall 16 would abut the stop (not shown) upon transitioning to the deployed condition 30.

Figures 12, 13, 14A, 14B, 15A, 15B:
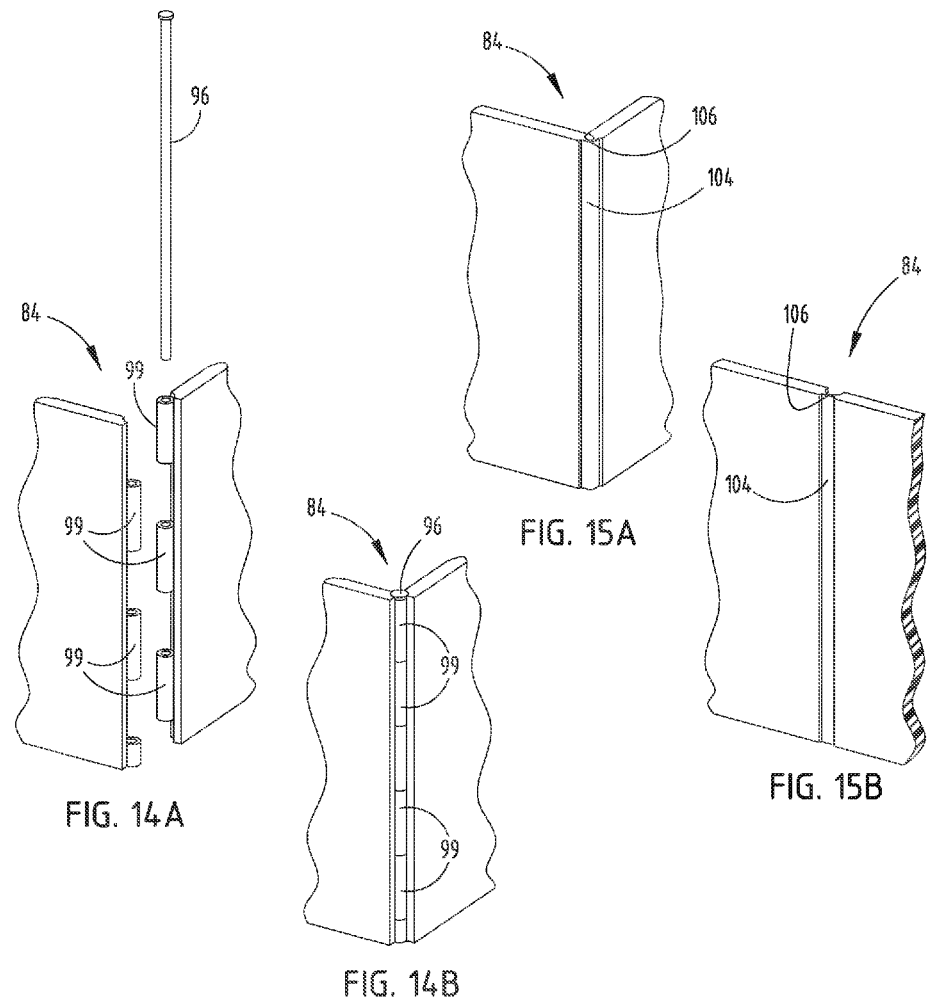
FIG. 12 is a side enlarged elevational view of the second side wall of FIG. 8.
FIG. 13 is a side enlarged elevational view of the second stanchion of FIG. 8.
FIG. 14A is an exploded front perspective view of a hinging assembly of the vehicular underseat storage assembly of the present invention.
FIG. 14B is an enlarged front perspective view of the hinging assembly of FIG. 14A.
FIG. 15A is an enlarged front perspective view of another hinging assembly of the vehicular underseat storage assembly of the present invention.
FIG. 15B is an enlarged front perspective view of the hinging assembly of FIG. 15A with a storage cavity in a collapsed condition.

As depicted in FIGS. 14A-15B, the hinging assemblies 84 may include various embodiments. The embodiment depicted in FIGS. 14A and 14B illustrates an integrally formed hinge in the first and second side walls 12, 16 and the front wall 20. In this embodiment, the hinge assembly 84 includes the pivot rod 96, which is inserted through integrally formed hinged tabs 98. In another embodiment, as illustrated in FIGS. 15A and 15B, the hinge assembly 84 is a living hinge that is formed between the front wall 20 and the second side wall 16, which does not require the pivot rod 96. The living hinge includes a narrowing strip 104 that may flex about a central portion 106 of the strip 104. Other hinging arrangements, such as attached piano hinges, are contemplated by this invention to accomplish the pivotable transition of the storage cavity 26 between the deployed condition 30 and the collapsed condition 28.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicular underseat storage assembly comprising:
   a seat;
   a rigid first side wall pivotally connected to a first stanchion;
   a rigid second side wall pivotally connected to a second stanchion; and
   a rigid front wall coupling a forward end of the first side wall to a forward end of the second side wall, together defining a storage cavity operable longitudinally between collapsed and deployed conditions by moving the front wall laterally.

2. The vehicular underseat storage assembly of claim 1, further comprising:
   a slider bracket coupled between the first side wall and the first stanchion, wherein the slider bracket is in a rearward position when the storage cavity is in the collapsed condition, and wherein substantially all of an inside surface of the first side wall is in abutting contact with an inside surface of the front wall when the storage cavity is in the collapsed condition.

3. The vehicular underseat storage assembly of claim 1, further comprising:
   a connector disposed at a distal location substantially co-planar to the first and second stanchions, wherein the connector is coupled to the forward end of the first side wall when the storage cavity is in the collapsed condition, and wherein the distal location is proximate a third stanchion.

4. The vehicular underseat storage assembly of claim 3, wherein the connector is one of a magnet, a snap, a strap, and a clasp, and wherein the forward end of the first side wall includes a complementary connecting member adapted to engage the connector.

5. A vehicular underseat storage assembly comprising:
   a seat;
   a rigid first side wall and a rigid second side wall disposed below the seat; and
   a rigid front wall coupling a forward end of the first side wall to a forward end of the second side wall, wherein the first side wall, second side wall, and front wall, together with a floor and an underside of the seat, define a storage cavity operable between a deployed condition in which the storage cavity includes a rectangular-shaped cross-section, and a collapsed condition in which the storage cavity includes a generally linear-shaped cross-section, and wherein transitioning between the deployed and collapsed conditions is further defined by the storage cavity having a rhomboid-shaped cross-section and the front wall moving laterally.

6. The vehicular underseat storage assembly of claim 5, wherein the first side wall is pivotally coupled with a first stanchion and the second side wall is pivotally coupled with a second stanchion.

7. The vehicular underseat storage assembly of claim 5, further comprising:
 a connector disposed at a distal location substantially co-planar to first and second stanchions coupled respectively with the first and second side walls, wherein the connector is coupled to the forward end of the first side wall when the storage cavity is in the collapsed condition.

8. The vehicular underseat storage assembly of claim 7, wherein the connector is one of a magnet, a snap, a strap, and a clasp, and wherein the forward end of the first side wall includes a complementary connecting member adapted to engage the connector.

9. The vehicular underseat storage assembly of claim 7, wherein the distal location is proximate a third stanchion.

10. The vehicular underseat storage assembly of claim 5, wherein the front wall moves laterally a predetermined distance substantially equal to a length of the first side wall between the deployed and collapsed conditions, and wherein the length of the first side wall is generally equal to a length of the second side wall.

11. The vehicular underseat storage assembly of claim 5, wherein the length of the first and second side walls is proportionally generally two-thirds that of a length of the front wall, and wherein the front wall is coupled to the first and second side walls by a hinge assembly integrally formed as part of the front wall, first side wall, and second side wall.

12. The vehicular underseat storage assembly of claim 5, wherein a secondary cavity is defined beneath the seat when the storage cavity is in the collapsed condition.

13. A vehicular underseat storage assembly comprising:
 first and second rigid side walls pivotally connected to first and second stanchions, respectively;
 a rigid front wall having opposing ends pivotally coupled with forward ends of the first and second sidewalls, defining a storage cavity together with a floor and a vehicle seat, wherein the storage cavity is operable between deployed and collapsed conditions by moving the front wall laterally a length of the first side wall.

14. The vehicular underseat storage assembly of claim 13, wherein each of the first side wall, second side wall, and front wall includes a projection adapted to abut an underside of the vehicle seat.

15. The vehicular underseat storage assembly of claim 13, wherein a secondary cavity is defined between the first and second stanchions and the storage cavity in the collapsed condition.

16. The vehicular underseat storage assembly of claim 13, wherein during transition of the storage cavity from the deployed condition to the collapsed condition, the front wall maintains an orientation substantially parallel to a line defined between the first and second stanchions.

17. The vehicular underseat storage assembly of claim 16, further comprising:
 a connector disposed at a distal location substantially co-planar to the first and second stanchions, wherein the connector is coupled to the forward end of the first side wall when the storage cavity is in the collapsed condition.

18. The vehicular underseat storage assembly of claim 17, wherein the connector is one of a magnet, a snap, a strap, and a clasp, and wherein the forward end of the first side wall includes a complementary connecting member adapted to engage the connector.

19. The vehicular underseat storage assembly of claim 13, wherein the front wall is coupled to the first and second side walls via a hinging arrangement, and wherein the length of the first and second side walls is proportionally generally two-thirds that of a length of the front wall.

\* \* \* \* \*